July 12, 1966   H. WEISS ETAL   3,260,932
MAGNET-FIELD MEASURING DEVICE WITH A GALVANOMAGNETIC
RESISTANCE PROBE
Filed May 7, 1964   4 Sheets-Sheet 1

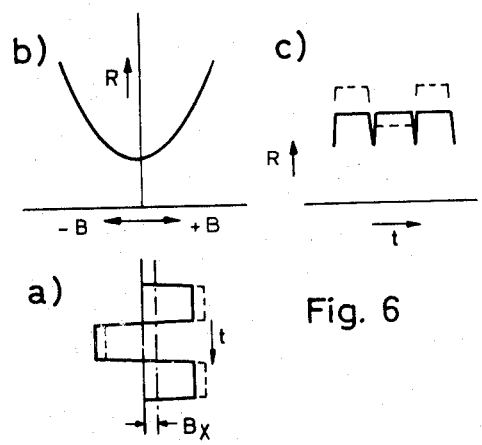
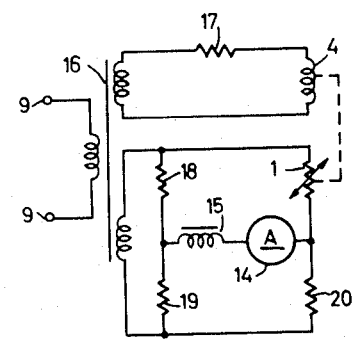
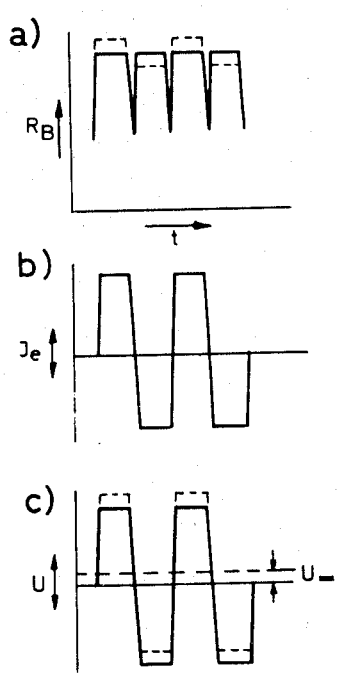
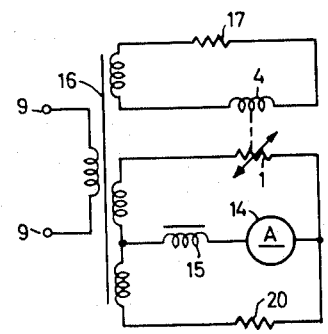
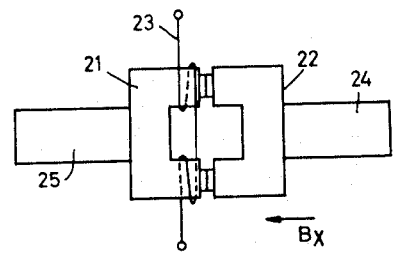

July 12, 1966  H. WEISS ETAL  3,260,932
MAGNET-FIELD MEASURING DEVICE WITH A GALVANOMAGNETIC
RESISTANCE PROBE
Filed May 7, 1964                    4 Sheets-Sheet 3
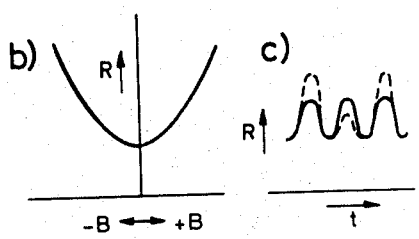
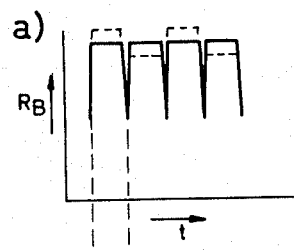
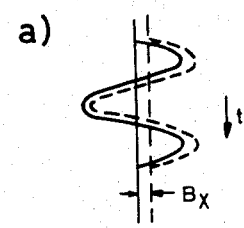
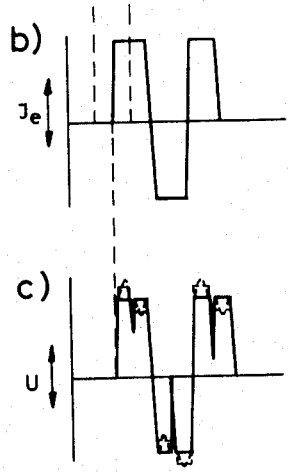
Fig. 12
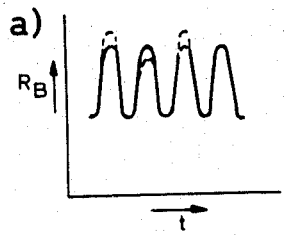
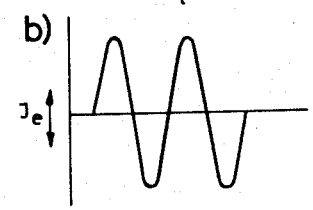
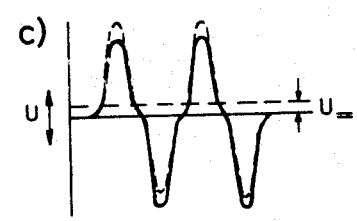
Fig. 14
Fig. 13
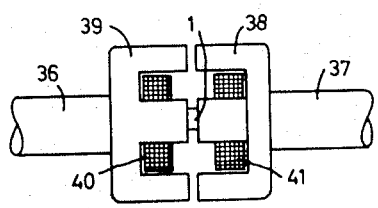
Fig. 16

United States Patent Office 3,260,932
Patented July 12, 1966

3,260,932
MAGNET-FIELD MEASURING DEVICE WITH A GALVANOMAGNETIC RESISTANCE PROBE
Herbert Weiss, Nurnberg, and Hans Martens, Erlangen, Germany, assignors to Siemens-Schuckertwerke Aktiengesellschaft, Erlangen, Germany, a corporation of Germany
Filed May 7, 1964, Ser. No. 365,833
Claims priority, application Germany, May 10, 1963, S 85,142
11 Claims. (Cl. 324—46)

Our invention relates to a device for measuring magnetic fields with the aid of a galvanomagnetic semiconducting resistor and is described herein with reference to the accompanying drawings in which:

FIG. 6 shows explanatory graphs relating thereto.

FIG. 8 shows explanatory graphs relating thereto.

FIGS. 9 and 10 illustrate further embodiments of circuit diagrams for measuring devices according to the invention.

FIG. 11 is a front view of still another device according to the invention.

FIGS. 12, 13 and 14 are explanatory diagrams.

FIGS. 16, 17 and 18 show three further measuring probes according to the invention.

Figure 1:
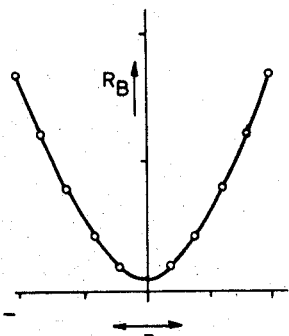
FIG. 1 is an explanatory graph relating to magnetogalvanic resistance in general.

Semiconducting resistors, also called "field plates," change their ohmic resistance when subjected to a magnetic field having a component perpendicular to the direction or plane in which an electric current passes through the field plate. A typical property of such galvanomagnetic resistors is the fact that the resistance value depends only upon the magnitude but not upon the direction of the magnetic field. FIG. 1 exemplifies the resistance value $R_B$ of a galvanomagnetic resistor versus magnitude and direction of the induction B of a magnetic field passing through the resistor. The resistance curve is mirror-symmetrical to the zero axis of the induction. That is, the electric resistance depends only upon the magnitude but not upon the positive or negative direction of the effective magnetic field. Generally, the curve resembles a parabola, the change in resistance being very slight at low values of magnetic induction.

If the change in resistance is employed for directly sensing or measuring a magnetic field, the measuring sensitivity at small field values is not sufficient for some purposes, a fact readily apparent from FIG. 1. It is therefore an object of our invention to provide a galvanomagnetic probe and measuring device that affords a greatly increased sensitivity, particularly when sensing or measuring magnetic fields of low induction or when responding to minute changes in magnetic induction.

Another object of our invention is to provide galvanomagnetic resistance probes of improved accuracy so as to afford a zero calibration independent of changes in temperature and unaffected by any occurring thermoelectric voltages.

According to a feature of our invention a device for sensing or measuring magnetic fields comprises a probe which contains at least one current-traversed galvanomagnetic resistor disposed in the magnetic circuit of an alternating magnetic field having a high frequency in comparison with the variations of the magnetic field to be measured. The galvanomagnetic resistance probe is connected, if necessary through amplifiers or other circuit components, with a measuring instrument through a filtering circuit which passes to the instrument substantially only that portion of the voltage drop at the galvanomagnetic resistor that is caused by the field being measured.

The novel probe does not require any adjustment. The zero point is independent of temperature, and any occurring thermo-voltages have no effect upon the measuring result when suitable circuits are employed. A high sensitivity is secured even with measuring fields of low induction, and the remanence of any iron parts joined with the probe cannot cause any falsification of the measuring result, so that special pre-magnetizing means are unnecessary. It is further possible to provide the measuring probe with only two supply leads. By suitable choice of the galvanomagnetic resistor, it can be given any desired resistance value so that the probe can be directly matched to an amplifier without requiring the interposition of special circuit components for resistance matching purposes.

A simple design of a probe according to the invention is shown in FIGS. 2a and 2b. The galvanomagnetic resistor 1 proper consists of a meander-shaped resistor body of semiconductor material, such as indium antimonide, which is mounted on a carrier plate and provided with terminals 2 and 3. Resistors of this type are illustrated and described, for example, in the copending application of Herbert Weiss et al., Serial No. 361,316, filed April 20, 1964. Also applicable are resistors as known from U.S. Patent 2,894,234. The resistor member 1 is mounted within a coil 4 which has two terminals 5 and 6 for supplying alternating current to produce an alternating field that traverses the plane of the galvanomagnetic resistor 1.

Figure 2:
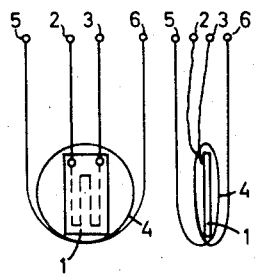
FIGS. 2a and 2b show schematically a front view and lateral view respectively of a measuring probe according to the invention.
Figure 3:
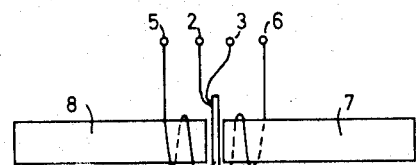
FIG. 3 illustrates a modified embodiment of a similar probe.

According to FIG. 3, showing substantially the same device as FIG. 2, two magnetizable rods 7 and 8 are coaxially mounted on opposite sides of the galvanomagnetic resistor 1 for augmenting the magnetic field in the semiconductor body of the resistor, thus improving the sensitivity of the device. The rods 7 and 8 preferably consist of ferroxcube-type ferrite of high magnetic permeability.

Figure 4:
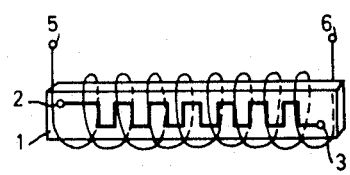
FIG. 4 shows schematically another galvanomagnetic resistance probe according to the invention.

If it is desired to avoid the use of ferromagnetic components, a probe as shown in FIG. 4 is preferable. The galvanomagnetic resistor 1 with its terminals 2 and 3 is given the shape of an elongated strip or rod, thus providing sufficient space for a sufficient number of turns of coil 4 to build up a high alternating field without the provision of ferromagnetic components.

Figure 5:
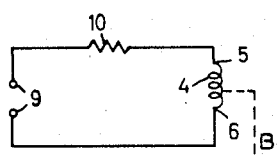
FIG. 5 is a circuit diagram applicable with such probes.

An electric circuit applicable with probes as shown in FIGS. 2, 3 and 4 is illustrated in FIG. 5. A source 9 furnishes an alternating voltage, for example of rectangular wave shape, and is connected through a normally fixed ohmic resistor with the terminals 5 and 6 of the coil 4. The galvanomagnetic resistor 1 is connected in series with another ohmic resistor 11 to a direct-voltage source 12. Connected in parallel to the galvanomagnetic resistor 1 is the series connection of a capacitor 13 and an ammeter 14. The field coil 4 in FIG. 5 is schematically shown linked with the galvanomagnetic resistor 1, the latter being exposed to the magnetic field to be measured so as to change its resistance in response to the latter field.

The operation of the circuit according to FIG. 5 will be explained with reference to FIG. 6. Shown by a full line in FIG. 6a is the induction-time curve of the alternating field produced by the coil 4. FIG. 6b exemplifies the resistance-inductance characteristic of the galvanomagnetic resistor 1 as explained above with reference to FIG.

1. It follows from the characteristic of FIG. 6b that the resistance-time curve of the galvanomagnetic resistor 1 corresponds to the one shown by full lines in FIG. 6c. When an unidirectional field of the magnitude $B_x$ is superimposed upon the alternating field, the galvanomagnetic resistor is subjected to the field changes represented by broken lines in FIG. 6a. This results, in accordance with the galvanomagnetic resistance characteristic, in the broken-line resistance curve shown in FIG. 6c. The field to be measured is effective upon the galvanomagnetic resistor only to the extent it has a component which is parallel to the lines-of-force direction of the auxiliary alternating field at the locality of the galvanomagnetic resistor. In the circuit of FIG. 5, the galvanomagnetic resistor 1 is traversed by direct current. Simultaneously, there occurs at the resistor 1 a voltage drop whose time curve corresponds to the resistance-time curve shown in FIG. 6c. Consequently the broken-line curve in FIG. 6c indicates that the field being measured causes an alternating-voltage component to become superimposed upon the direct-voltage drop of the galvanomagnetic resistor, the alternating-voltage component being proportional to the magnitude of the field to be measured.

When the field being measured reverses its polarity, there occurs a change in the phase angle between the alternating-voltage component of the voltage drop at the galvanomagnetic resistance and the excitation current of the superimposed alternating field. As explained, the alternating-voltage drop is applied through a filter connection, comprising the capacitor 13 in FIG. 5, and if necessary through an amplifier or rectifier, to the measuring or recording instrument here schematically represented by the ammeter 14. The phase position of the alternating-voltage drop relative to the excitation current of the alternating field, and hence the direction of the magnetic field being measured, can be ascertained, for example, by passing the alternating-voltage component of the voltage drop through a ring modulator controlled by the excitation current of the alternating field. When operating at low frequency, the phase-accurate rectification of the alternating voltage can also be effected with the aid of a mechanical D.-C. to A.-C. converter (inverter) or rectifier.

While in the circuit described, the alternating component of the voltage drop at the galvanomagnetic resistors is used for measuring the magnetic field, the embodiments described hereinafter employ the direct-voltage component of that voltage drop as a magnitude proportional to the field being measured. For this purpose, the circuit exemplified by FIG. 7 comprises the galvanomagnetic resistor 1 in series connection with the coil 4 that produces the auxiliary alternating field, both being connected to the alternating-voltage source 9. Consequently the galvanomagnetic resistor is traversed by an alternating current having the same frequency and phase as the excitation current of the alternating field.

Figure 7:
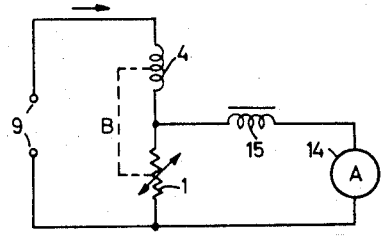
FIGS. 7 and 7a are two other circuit diagrams applicable for the purposes of the invention.

FIG. 8a shows for this case the time curve of the resistance $R_B$ of the galvanomagnetic resistor without the effect of the field to be measured. FIG. 8b shows the current curve of the current $J_e$ flowing through the galvanomagnetic resistor. The voltage drop U shown in FIG. 8c results from the resistance and current values of FIGS. 8a and 8b respectively. The full-line curves apply to the zero value of the field being measured. The broken-line curves apply to a condition where the measuring field is superimposed upon the auxiliary alternating-current field produced by the coil 4. As will be seen from FIG. 8c, the voltage drop comprises a direct-voltage component $U_=$ which constitutes a measure of the magnetic field to be measured. For determining this direct-voltage component, the circuit in FIG. 7 is equipped with a choke coil 15 and an ammeter 14 connected in series with each other across the galvanomagnetic resistor 1. The choke 15 represents the simplest case of a filter component which excludes the alternating-voltage component from the instrument 14.

Figure 7A:
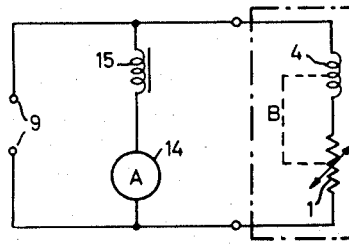

The same measuring result is obtained if, according to FIG. 7a, the entire voltage drop at the series connection of coil 4 and galvanomagnetic resistor 1 is impressed across the series connection of choke 15 and instrument 14, a voltage source 9 of a high internal resistance being used. Such a circuit operates with only two leads attached to the measuring probe.

The alternating-voltage component can also be suppressed by means of a bridge network such as the one illustrated in FIG. 9. Connected to the voltage source 9 is the primary winding of a transformer 16 which has two secondary windings. One of the secondary windings is connected through a series resistor 17 to the coil 4 for producing the alternating field in the probe. The other secondary winding energizes a bridge network which contains the galvanomagnetic resistor 1 in one of its four branches. The three other branches contain respective resistors 18, 19 and 20. A choke coil 15 and an ammeter 14 are shown series connected in the output diagonal of the bridge. The bridge is balanced so that no direct voltage is impressed upon the measuring instrument 14 when no measuring field is effective upon the galvanomagnetic resistor 1 of the probe. The indication of the instrument 14 corresponds to the magnitude and direction of the field being measured.

A simplified bridge network is shown in FIG. 10. The transformer 16 has three secondary windings. Two of them are connected in respective branches of the bridge in lieu of the resistors 18 and 19 (FIG. 9). In other respects the circuit of FIG. 10 corresponds to that of FIG. 9.

A further reduction of the alternating-voltage share in the direct-current signal usefully employed for indicating purposes, is obtained if, for example, the resistor 20 in FIG. 10 is likewise designed as a galvanomagnetic resistor and is also mounted in the measuring probe to form part thereof.

An example for the provision of such a second magnetic-field responsive resistor is shown in FIG. 11. The two galvanomagnetic resistors are located in the respective air gaps of two U-shaped yokes 21 and 22 of magnetizable material having high magnetic permeability. An alternating flux is produced in the two field gaps by means of a coil 23. The magnetic field to be measured becomes superimposed upon this alternating auxiliary flux and is augmented by rods 24 and 25 of ferromagnetic material such as ferroxcube-type ferrite, Mu-metal or other high-permeability material. The magnetic field to be measured becomes superimposed upon the auxiliary alternating field so that the sum of measuring field and alternating field occurs in one of the two galvanomagnetic resistors while simultaneously the difference of the two fields occurs in the other resistor. The resistance values of the two galvanomagnetic resistors thus change in push-pull relation. If the galvanomagnetic resistors exhibit resistance changes that slightly depart from each other, any such discrepancy can be compensated by giving the air gaps respectively different widths. In this case, the superimposed field being measured acts somewhat more strongly upon one of the two galvanomagnetic resistors than upon the other.

In the above-described circuits, the excitation current for the alternating auxiliary field may have a rectangular or sinusoidal wave shape. This excitation current may also have sinusoidal shape, whereas the current passing through the galvanomagnetic resistor has a rectangular wave shape, or vice versa. Furthermore, the alternating auxiliary field may be excited by a voltage of rectangular wave shape so that the time curve of the excitation current has a substantially triangular shape. The resistance-time curve shown for the galvanomagnetic resistor in FIG. 12 applies under the condition that the voltage source 9 in FIG. 7 furnishes a sinusoidal voltage.

FIG. 12a exemplifies the time curve of the alternating-field induction, FIG. 12b the resistance-induction characteristic of the galvanomagnetic resistor, and FIG. 12c the resulting time curve of the galvanomagnetic resistance value. The broken-line curves apply to the presence of a measuring field $B_x$. The voltage drop occurring at the galvanomagnetic resistor is represented in FIG. 13. FIG. 13a shows the time curve of the valvanomagnetic resistance $R_B$. FIG. 13b is the time curve of the sinusoidal current $J_e$ flowing through the galvanomagnetic resistor. The voltage drop U at the galvanomagnetic resistor, resulting from FIGS. 13a and 13b, is represented in FIG. 13c. This voltage drop has a direct-voltage component $U_=$, which is suitable for indicating or recording the magnitude of the field to be measured.

In the circuits described above, either an alternating voltage having the frequency of the superimposed alternating field, or a direct voltage, is made available as a measuring magnitude that is proportional to the magnetic field to be measured. Described in the following is a device which utilizes the second harmonic of an alternating-voltage drop at the galvanomagnetic resistor for measuring the field to which the probe is subjected. In these devices the alternating current flowing through the galvanomagnetic resistor, is given a 90° phase displacement relative to the alternating auxiliary field, because this is a preferred way of forming the second harmonic of the alternating voltage drop at the galvanomagnetic resistor.

The formation of the second harmonic, relating to the case of an alternating current of rectangular wave shape from a source of high internal resistance, will be explained with reference to FIG. 14. FIG. 14a represents the time curve of the galvanomagnetic resistance value. The full-line curve relates to conditions obtaining when the measuring field is absent. The broken-line curves relate to the conditions existing when a measuring field is applied. FIG. 14b shows the time curve of the current flowing through the galvanomagnetic resistor, this curve being 90° phase displaced relative to the excitation current of the alternating field. The resulting voltage drop at the galvanomagnetic resistor is represented in FIG. 14c. When a measuring field is effective (broken-line curve) there result even harmonics, the second harmonic being also shown by broken lines in FIG. 14c.

Figure 15:
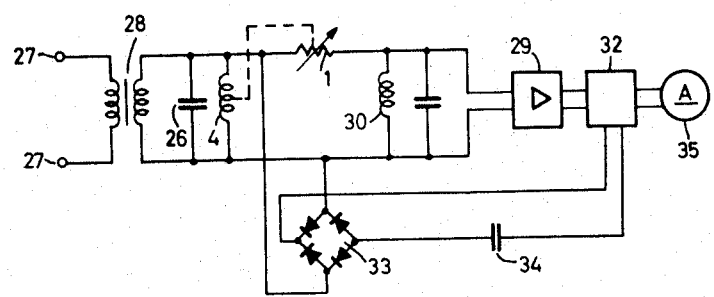
FIG. 15 is a circuit diagram of a device according to the invention for response to the second harmonic of the voltage drop along a galvanomagnetic resistor.

FIG. 15 exemplifies a circuit that permits measuring a magnetic field with the aid of a galvanomagnetic resistance probe in response to the second harmonic of the voltage drop at the galvanomagnetic resistor. The coil 4 of the probe is connected in shunt with a capacitor 26 and energized from an alternating-voltage source 27 through a transformer 28. The coil 4 and the capacitor 26 constitute a tank circuit tuned to the fundamental frequency. This reduces the current consumption and improves the sinusoidal course of the excitation current in coil 4 in the event the utility voltage supplied at terminals 27 becomes distorted. Connected parallel to the coil 4 is the series connection of the galvanomagnetic resistor 1 with an amplifier 29, so that the galvanomagnetic amplifier is connected to the same voltage source as the tank circuit 4–26. Consequently a phase displacement of about 90° exists between the excitation current of the alternating field and the current flowing through the galvanomagnetic resistor. Connected in parallel relation to the input terminals of the amplifier 29 is a second tank circuit composed of an inductivity 30 and a capacitor 31 and tuned to twice the frequency of the feeder voltage so as to have low impedance with respect to the fundamental wave.

The output circuit of the amplifier 29 is connected with a ring modulator 32 which is controlled through a rectifier 33 and a capacitor 34 by the alternating-voltage component of the rectified feeder voltage, i.e. by a voltage of doubled frequency. Consequently at the output of the ring modulator 32 there appears the component of the upper-harmonics voltage whose direction coincides with that of the alternating component of the rectified feeder voltage. The output voltage of the ring modulator therefore is a measure of the magnitude and direction of the field being measured. Therefore, the output terminals of the ring modulator 32 are directly connected to a measuring instrument 35.

In the embodiment of the galvanomagnetic probe according to the invention illustrated in FIG. 16, two ferromagnetic rods 36 and 37 serve to concentrate the measuring field at the locality of the galvanomagnetic resistor. The two rods are secured to respective magnetizable yokes 38 and 39 of three-legged shape. Located on the respective middle legs of these yokes are coils 40 and 41 to be traversed by the excitation current for the alternating auxiliary field. The galvanomagnetic resistor 1 is located in the middle one of the three air gaps. This middle gap is kept narrower than the two outer gaps. The use of such yokes for guiding the magnetic alternating field reduces the excitation power and affords the advantage that the excitation power is limited to a narrow space and cannot result in disturbing the external field to be measured.

Figure 17:
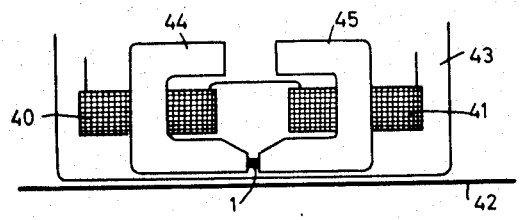

As exemplified by FIG. 17, a galvanomagnetic resistance device according to the invention can be designed for reproducing magnetic signals recorded on magnetizable carriers, such as for the reproduction of sound recorded on tape. The tape 42 passes by the galvanomagnetic probe. A shielding foil 43 of electrically good conducting but non-magnetic material is disposed between the record-carrier tape 42 and the probe. The probe comprises coils 40 and 41 for producing a superimposed alternating field. These coils are placed around respective magnetizable yokes or core members 44, 45 which form between each other a sensing gap in which the galvanomagnetic resistor 1 is located. The thickness of the shielding foil 43 is so chosen that the high-frequency field produced by the coils 40 and 41 cannot penetrate to the outside, whereas the field lines of the measuring field resulting from the magnetic records on tape 42, but changing at a much lower frequency, can pass through the shielding foil 43 without producing appreciable amounts of eddy currents that may cause noticeable attenuation.

Figure 18:
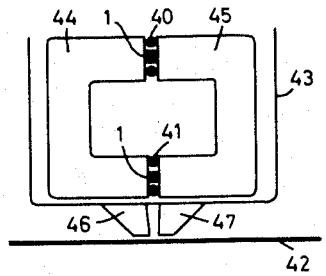

A modified design of such a pickup device is shown in FIG. 18. In this embodiment, two ferromagnetic connecting pieces or pole shoes 46 and 47 of high magnetic permeability are mounted between the shielding foil 43 and the magnetic tape 42 for guiding the measuring field to the magnetic yoke pieces 44 and 45. In this embodiment, two galvanomagnetic resistors 1 are mounted in respective two air gaps of the U-shaped yokes 44 and 45, and the coils 40 and 41 are likewise mounted in the air gap so that the stray field is greatly reduced.

Described presently is an example of the measuring sensitivity obtainable with devices according to the invention. With a device according to FIG. 16 in a circuit as shown in FIG. 5, a measuring sensitivity of 0.5 V/G was measured on the basis of the following data ($V=$voltage, $G=$field strength in Gauss):

Length of each rod 36, 37 consisting of Mu-metal: 200 mm.

Diameter of the Mu-metal rods: 200 mm. each $R_0=60$ ohm, resistance of the galvanomagnetic resistor without magnetic field $B=2$ kG, amplitude of the rectangular-wave magnetic field $R_B=120$ ohm, resistance of the galvanomagnetic resistor in a magnetic field $\pm 2$ kG $I=30$ ma. direct current passing through the galvanomagnetic resistor $R=300$ ohm, resistance of the measuring instrument.

When performing measuring operations of the above-mentioned sensitivity, the magnetic alternating field was excited by current of an approximately rectangular wave shape, obtained from a mechanical inverter. The rectangular-wave voltage, proportional to the field being measured, was separated by means of an electrolyte capacitor from the direct-voltage drop at the galvanomagnetic resistor, then rectified and measured by means of a galvanometer.

In some circuits, the voltage inevitably induced in the galvanomagnetic resistor inclusive of its current-supply leads, has a disturbing effect. Such disturbance can be minimized with the aid of a wire loop in known manner. That is, the current-supply leads are preferably so placed beside each other that the inductive effect of one is substantially cancelled by that of the other. Another way is to employ two galvanomagnetic resistors and to connect them in series with such an orientation relative to induced voltages that these voltages will substantially cancel each other. With an approximately rectangular wave shape of the alternating field, the induced voltage consists of short but high voltage peaks. These can be reduced by means of conventional amplitude limitation if desired. Another way is to render the amplifier or ring modulator, or also the mechanical rectifier, ineffective for the short intervals of the voltage peaks, i.e. during those short intervals in which the rectangular-wave magnetic field reverses its polarity.

The share of the voltage drop occurring at the galvanomagnetic resistor and supplied to the measuring instrument depends not only upon the magnitude of the magnetic field being measured but is also proportional to the current flowing through the galvanomagnetic resistor. A device according to the invention, therefore, is also suitable for forming the mathematical product of two magnitudes if the measuring field and the control current passing through the galvanomagnetic resistor are both made variable and dependent upon the respective magnitudes to be multiplied with each other. If furthermore the alternating auxiliary field is made proportional to a third variable magnitude, the measuring instrument of the magnetic-field measuring device indicates the mathematical product of these three variable magnitudes. For example, when using the device of FIG. 16 in a circuit according to FIG. 5, the magnetizable rods 36, 37 (FIG. 16) may thus be excited by a coil whose current varies in accordance with a first variable magnitude, and the current flowing from source 12 (FIG. 5) through the galvanomagnetic resistor may then be varied in accordance with a second variable magnitude. Furthermore, the alternating current supplied to the auxiliary field coils 40, 41 (FIG. 16) may vary in accordance with a third variable. The output voltage from across the galvanomagnetic resistor is proportional to the product of the two or three variables.

To those skilled in the art it will be obvious upon a study of this disclosure that our invention permits of various modifications with respect to design of the galvanomagnetic probe and with respect to circuitry as well as particular application, and hence can be given embodiments other than those illustrated and described herein, without departing from the essential features of our invention and within the scope of the claims annexed hereto.

We claim:

1. A device for measuring magnetic fields comprising a galvanomagnetic resistor for response to the field to be measured, current supply means connected to said resistor for passing current therethrough during measuring operation, magnetic means for superimposing an auxiliary magnetic field upon said resistor, alternating-current supply means connected with said magnetic means for producing said auxiliary field at a high frequency compared with the changes of the field to be measured, measuring means, and a filtering circuit connecting said measuring means to said galvanomagnetic resistance for controlling said measuring means substantially only in response to voltage changes caused along said resistor by said measuring field.

2. In a magnetic-field measuring device according to claim 1, said superimposed auxiliary magnetic field having an induction-time characteristic of substantially rectangular wave shape.

3. In a magnetic-field measuring device according to claim 1, said superimposed auxiliary magnetic field having an induction-time characteristic whose periodic maximum amplitude of induction is larger than the maximal induction occurring in said field to be measured.

4. In a magnetic-field measuring device according to claim 1, said current supply means for said galvanomagnetic resistor having a normally constant direct voltage, and said filtering circuit comprising a capacitor which permits only the alternating-voltage component of the voltage drop at said resistor to reach said measuring means.

5. In a magnetic-field measuring device according to claim 1, said current supply means for said galvanomagnetic resistor having an alternating voltage and a current of the same frequency and phase position as the induction of said auxiliary field, said filtering circuits comprising a choke coil in series with said measuring means so that substantially only the direct-voltage component of the voltage drop of said resistor can act upon said measuring means.

6. In a magnetic-field measuring device according to claim 1, said current supply means for said galvanomagnetic resistor having an alternating voltage of the same frequency as said auxiliary field, said filtering circuit comprising a filter connected in series with said galvanomagnetic resistor and tuned to the even harmonics of said high frequency of said auxiliary field, whereby said measuring means are controlled by an electric magnitude proportional to the even harmonics of said auxiliary-field frequency.

7. In a magnetic-field measuring device according to claim 1, said magnetic means comprising two ferromagnetic rods of high-permeability material coaxially aligned on opposite sides of said galvanomagnetic resistor and having respective high-frequency windings for connection to said alternating-current supply means, said auxiliary field being adjusted to have in said rods an induction amplitude which compensates remanence due to the field being measured.

8. In a magnetic-field measuring device according to claim 1, said magnetic means comprising a generally ring-shaped core structure of magnetizable material having a field gap in which said galvanomagnetic resistor is located and having windings on said structure for connection to said alternating-current supply means, whereby the auxiliary high-frequency field is limited to a narrow space at said resistor and disturbance of the measuring field by said auxiliary field is substantially prevented.

9. A device for measuring magnetic field according to claim 1, comprising a shielding foil of good conducting non-magnetic material having a thickness at which the shielding is effective substantially only for the high-frequency auxiliary field but not for the measuring field.

10. In a device according to claim 1, the current of said supply means being variable in dependence upon a variable control magnitude, whereby said instrument responds in proportion to the mathematical product of said control magnitude times the variation of said field being measured.

11. In a device according to claim 10, said auxiliary field having an induction variable in dependence upon another control magnitude, whereby the response of said instrument is proportional to the mathematical product of said two control magnitudes.

References Cited by the Examiner
UNITED STATES PATENTS 2,939,091   5/1960   Boek et al. _____ 324—46

RICHARD B. WILKINSON, *Primary Examiner.*